Feb. 8, 1949.  H. C. BARNACK  2,461,022
VARIABLE POWER AND SPEED TRANSMISSION
Filed March 14, 1945  2 Sheets-Sheet 1
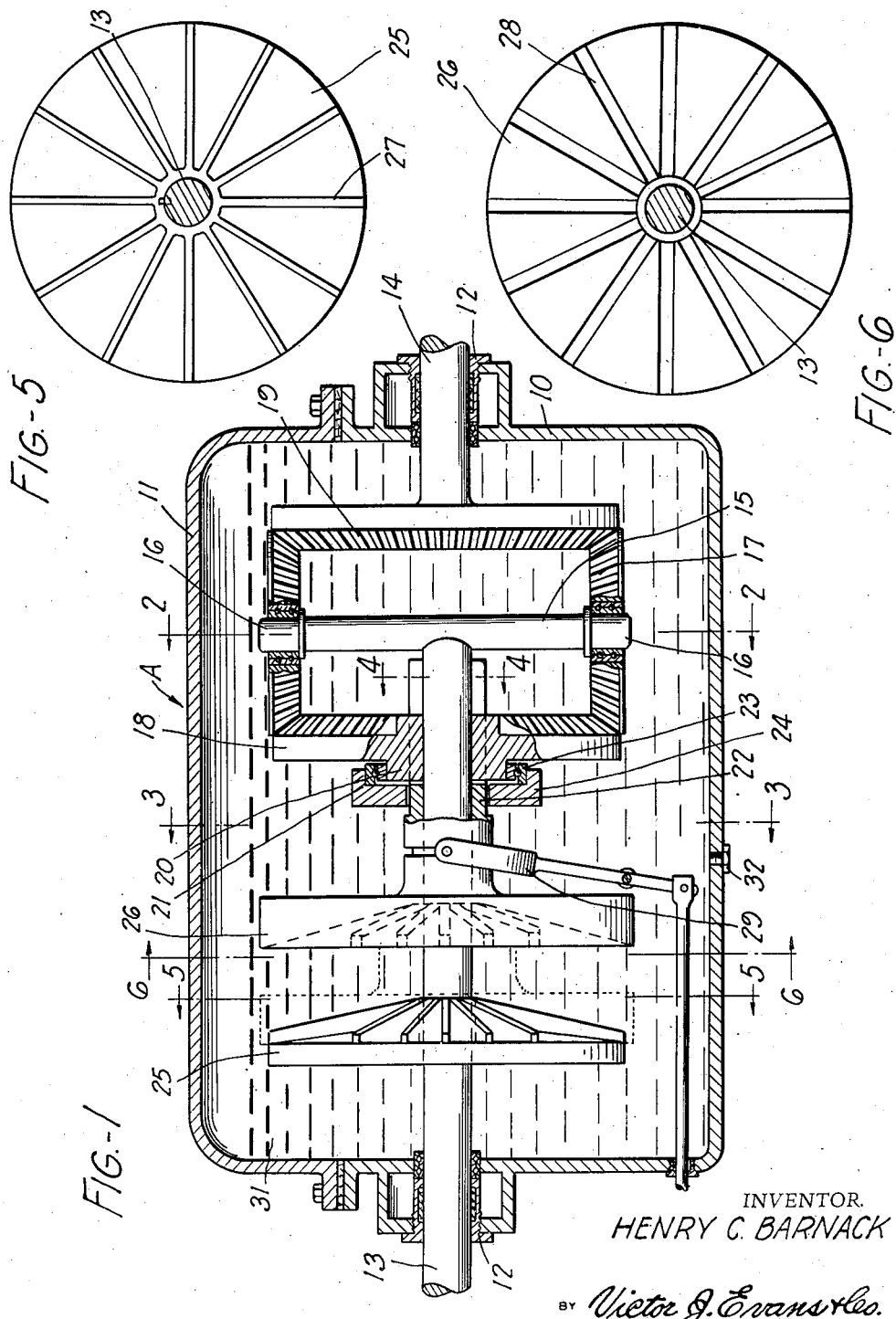
INVENTOR.
HENRY C. BARNACK
BY *Victor J. Evans & Co.*
ATTORNEYS

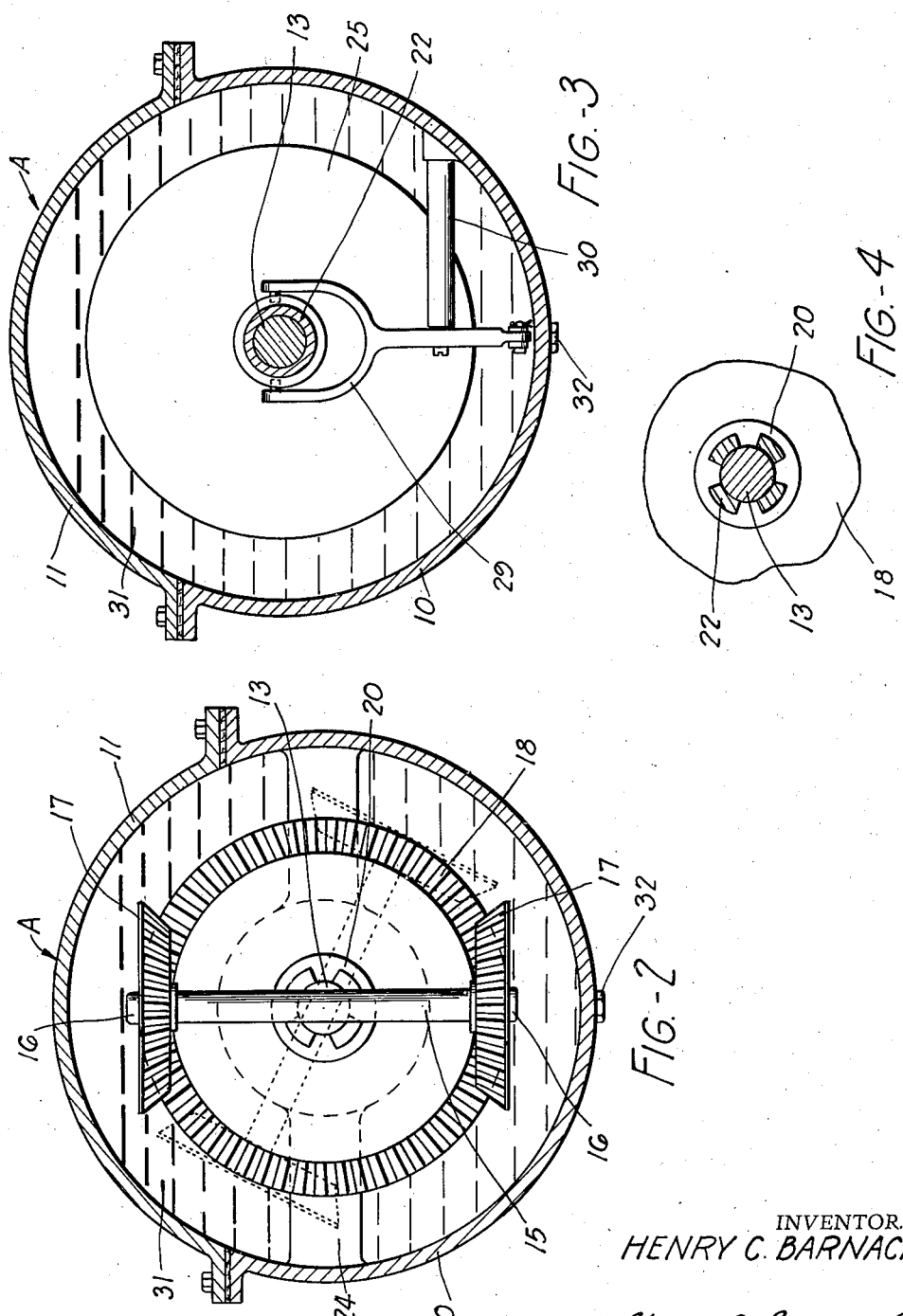

Patented Feb. 8, 1949

2,461,022

UNITED STATES PATENT OFFICE 2,461,022

VARIABLE POWER AND SPEED TRANSMISSION

Henry C. Barnack, West Springfield, Mass.

Application March 14, 1945, Serial No. 582,746

1 Claim. (Cl. 74—681)

The invention relates to a transmission mechanism for power driven units, and more especially to a hydraulically operated gear transmission for variable power and speed transmissions.

The primary object of the invention is the provision of mechanism of this character, wherein the construction thereof is novel and unique in the arrangement of its parts, which are few in number, so as to be compact and least liable to get out of order, the mechanism being effective for transmission that turns from a ratio of 1-0 or still position, to a ratio of 1-1 or direct drive, which latter drive is had without shifting gears, and the ratio change is continuous and smooth, eliminating the shifting of numerous gears, as is a fact in common practice with the present day transmissions.

Another object of the invention is the provision of mechanism of this character, wherein variable selective power and speed transmission may be had without gear shifting operations, the mechanism being confined within a housing containing fluid, the parts operating therein, so that wear thereon is at a minimum, as they will at all times be thoroughly lubricated automatically.

A further object of the invention is the provision of mechanism of this character, which is simple in construction, thoroughly reliable and efficient in operation, strong, durable, readily and easily controlled, particularly designed for motor vehicle service, and inexpensive to manufacture and install.

With these and other objects in view the invention consists in the features of construction, combination and arrangement of parts as will be hereinafter more fully described, illustrated in the accompanying drawings, which show the preferred embodiment of the invention, and pointed out in the claim hereunto appended.

In the accompanying drawings—

Figure 1 is a longitudinal central section of a fluid power transmission mechanism constructed in accordance with the invention.

Figure 2 is a sectional view taken on the line 2—2 of Figure 1 looking in the direction of the arrows.

Figure 3 is a sectional view taken on the line 3—3 of Figure 1 looking in the direction of the arrows.

Figure 4 is a sectional view taken on the line 4—4 of Figure 1 looking in the direction of the arrows.

Figure 5 is a sectional view taken on the line 5—5 of Figure 1 looking in the direction of the arrows.

Figure 6 is a sectional view taken on the line 6—6 of Figure 1 looking in the direction of the arrows.

Similar reference characters indicate corresponding parts throughout the several views in the drawings.

Referring to the drawings, A designates generally the transmission mechanism in its entirety constructed in accordance with the invention, and comprises a casing or housing 10, forming a combined fluid and gear container, it being sectional and involving a removable cover or top 11, while opposite ends of this casing or housing 10 have built therewith packing glands 12, which are aligned with each other. Extending through the glands 12 are the driving and driven shafts 13 and 14, respectively. The shaft 13 is operated from a power unit, not shown, and the power from the latter is taken off from the driven shaft 14 in any selected manner.

The driving shaft 13 interiorly of the casing or housing 10 is formed with a cross-journal 15, with arbor terminals 16 on which are rotatably fitted bevel gears 17, enmesh with bevel gears 18 and 19, respectively, the latter gear 19 being fixed to the driven shaft 14, while the gear 18 is loose on the driving shaft 13. The hub 20 of this gear 18 has a slidable spline or clutch coupling at 21 to an extension sleeve 22 free about the driving shaft 13 and in bearing fitting at 23 with a double web spider 24, which is unitary with the casing or housing 10 interiorly thereof.

On the power or driving shaft 13 and the extension sleeve 22 are the finned fluid impact disk-like members 25 and 26, respectively, the member 25 fast to the driving shaft being formed with the exposed radial fins 27, while the number 26 integral with the extension sleeve 22 has the enclosed radial fins 28. The member 26 is movable toward and away from the member 25, the fins thereof being in confronting relation to each other, through the use of a manually shiftable throw fork 29, which is connected with the sleeve 22 as best seen in Figure 1 of the drawings, the fork being pivotally supported by a hanger 30 interiorly of the casing or housing 10.

Filling the casing or housing 10 is a fluid 31 for the hydraulic action of the mechanism, there being a drain plug 32 provided at the bottom of the said casing or housing.

In the operation of the mechanism A, as the member 26 is brought closer to the member 25, the output shaft starts turning in a low gear ratio and the speed of ouput gradually increases. In low speed output the member 26 turns faster than the member 25, both turning clockwise, and as the member 26 slows down to the corresponding speed of the member 25, the output shaft increases in speed, and thus the level gears 17 stop turning in direct drive and the whole assembly turns as one unit.

From the foregoing it is thought that the construction and manner of operation of the mechanism A will be clearly understood, and therefore, a more extended explanation has been omitted for the sake of brevity.

What is claimed is:

A transmission consisting of a fluid-tight casing, fluid therein, driving and driven shafts axially aligned with each other and rotatable mounted in opposite ends of and extending into said casing, the ends of said shafts being axially spaced a predetermined distance from each other in said casing, a cross-shaft secured to said driving shaft, a pair of bevel gears journalled on said cross-shaft, a first bevel gear fixed to said driven shaft and meshing with said pair of bevel gears, a second bevel gear rotatably mounted on said driving shaft and meshing with said pair of bevel gears, a fluid impact driven member having a series of radially-disposed grooves and slidably journalled upon said driving shaft, means extending from said impact driven member slidably keying the same to said second bevel gear for driving the same while allowing relative axial movement between said impact driven member and said gear, a driving impact member having radially-disposed fins complementary to said radially-disposed grooves and adapted to be received thereby, said driving impact member being fixed to said driving shaft, means slidably engaging said driven impact member for shifting the same relative to said driving impact member.

HENRY C. BARNACK.

REFERENCES CITED

The following references are of record in the file of this patent:

UNITED STATES PATENTS

| Number | Name | Date |
|---|---|---|
| 1,242,974 | Pinckney | Oct. 16, 1917 |
| 1,270,323 | Radcliffe | June 25, 1918 |
| 1,764,849 | O'Connor | June 17, 1930 |
| 2,073,357 | Wemp | Mar. 9, 1937 |
| 2,129,884 | Swan | Sept. 13, 1938 |
| 2,336,055 | Bacon | Dec. 7, 1943 |
| 2,336,167 | Dillon | Dec. 7, 1943 |
| 2,383,981 | Lysholm | Sept. 4, 1945 |
| 2,385,059 | Buthe | Sept. 18, 1945 |

FOREIGN PATENTS

| Number | Country | Date |
|---|---|---|
| 666,841 | France | Oct. 7, 1929 |